United States Patent
Nishigori

(10) Patent No.: US 10,264,180 B2
(45) Date of Patent: Apr. 16, 2019

(54) IMAGE CORRECTION APPARATUS AND METHOD FOR CONTROLLING IMAGE CORRECTION APPARATUS

(71) Applicant: CANON KABUSHIKI KAISHA, Tokyo (JP)

(72) Inventor: Hidetoshi Nishigori, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 154 days.

(21) Appl. No.: 15/382,472

(22) Filed: Dec. 16, 2016

(65) Prior Publication Data
US 2017/0187959 A1   Jun. 29, 2017

(30) Foreign Application Priority Data
Dec. 24, 2015 (JP) ................. 2015-252295

(51) Int. Cl.
| | |
|---|---|
| *H04N 5/232* | (2006.01) |
| *H04N 5/357* | (2011.01) |
| *H04N 9/04* | (2006.01) |
| *H04N 5/262* | (2006.01) |

(52) U.S. Cl.
CPC ..... *H04N 5/23248* (2013.01); *H04N 5/23287* (2013.01); *H04N 5/262* (2013.01); *H04N 5/3572* (2013.01); *H04N 9/045* (2013.01)

(58) Field of Classification Search
None
See application file for complete search history.

(56) References Cited

U.S. PATENT DOCUMENTS

| | | |
|---|---|---|
| 2008/0062409 A1 | 3/2008 | Utsugi |
| 2012/0044369 A1 | 2/2012 | Irisawa |

FOREIGN PATENT DOCUMENTS

| | | |
|---|---|---|
| JP | 2014-053720 A | 3/2014 |

*Primary Examiner* — Mark T Monk
(74) *Attorney, Agent, or Firm* — Canon U.S.A., Inc. IP Division

(57) ABSTRACT

An apparatus which corrects magnification chromatic aberration of image data, and includes an image processing circuit. The image processing circuit corrects magnification chromatic aberration with respect to picked-up image data which has been picked up by an image sensor through an image pickup optical system that includes a correcting lens that corrects an image blur by shifting a position of the correcting lens. In accordance with an operation amount of the correcting lens, the image processing circuit selects and executes either of a first correction process in which a correction amount stored in a memory in advance is read to correct magnification chromatic aberration, or a second correction process in which a correction amount is calculated using the picked-up image data to correct magnification chromatic aberration.

18 Claims, 5 Drawing Sheets

IMAGE CORRECTION APPARATUS AND METHOD FOR CONTROLLING IMAGE CORRECTION APPARATUS

BACKGROUND OF THE INVENTION

Field of the Invention

The aspect of the embodiments relates to an image correction apparatus and a method for controlling an image correction apparatus.

Description of the Related Art

In recent years, image pickup apparatuses have been used which have a blur correction function with which an object image blur caused by motion of an image pickup apparatus during shooting can be corrected. Some image pickup apparatuses with the blur correction function includes a correcting lens which shifts its position in order to correct an image blur. There is an image pickup apparatus which has a function to correct, by image processing, magnification chromatic aberration in which a symmetry is broken, which is caused when such a correcting lens operates for blur correction.

As technology relating to such correction, an imaging apparatus is disclosed in Japanese Patent Laid-Open No. 2014-053720 which holds in advance, as data, an amount of distorted aberration corresponding to an amount of decentering of a lens group. In Japanese Patent Laid-Open No. 2014-053720, the imaging apparatus is disclosed which calculates, from data the imaging apparatus holds, an amount of correction for correcting distorted aberration at a predetermined position in an image indicated by an image signal to correct the distorted aberration.

In US 2012/0044369, an imaging apparatus is disclosed which selects, from a database based on lens control information, an amount of concentric aberration correction for correcting concentric aberration, which is a component of magnification chromatic aberration and generates a concentric color shift from the center of an image. The imaging apparatus disclosed in US 2012/0044369 corrects a pixel value based on the selected amount of concentric aberration correction.

Furthermore, in US 2008/0062409, an image processing device is disclosed which divides an image into a plurality of areas, detects a color shift in each divided area in a radial direction, performs vector composition with respect to the color shifts in neighboring divided areas, and consequently, detects magnification chromatic aberration which is not in a point symmetry with respect to a center of a frame.

However, regarding the imaging apparatuses disclosed in Japanese Patent Laid-Open No. 2014-053720 and US 2012/0044369, erroneous correction may be caused when a correction lens is driven for blur correction and the position of the correction lens cannot be obtained accurately. In addition, since the imaging apparatus disclosed in Japanese Patent Laid-Open No. 2014-053720 holds in advance, as data, an amount of distorted aberration corresponding to an amount of decentering of a lens group, a used capacity of a memory for the held data is increased.

In addition, regarding the imaging apparatus disclosed in US 2012/0044369, there may be a case where it is difficult to properly correct magnification chromatic aberration in which a symmetry is significantly broken since the imaging apparatus uses an amount of concentric magnification chromatic aberration correction.

Furthermore, since the image processing device disclosed in US 2008/0062409 divides an image into a plurality of areas, detects a color shift in each divided area in a radial direction, and performs vector composition with respect to the color shifts in neighboring divided areas, an amount of calculation increases.

SUMMARY OF THE INVENTION

An apparatus includes an image processing circuit that corrects magnification chromatic aberration with respect to picked-up image data which has been picked up by an image sensor through an image pickup optical system that includes a correcting lens that corrects an image blur by shifting a position of the correcting lens, in which in accordance with an operation amount of the correcting lens, the image processing circuit selects and executes either of a first correction process in which a correction amount stored in a memory in advance is read, and magnification chromatic aberration is corrected with respect to the picked-up image data, or a second correction process in which a correction amount is calculated using the picked-up image data, and magnification chromatic aberration is corrected with respect to the picked-up image data.

Further features of the disclosure will become apparent from the following description of exemplary embodiments (with reference to the attached drawings).

DESCRIPTION OF THE EMBODIMENTS

Hereinbelow, an exemplary embodiment of the disclosure will be described with reference to the attached drawings.

Figure 1:
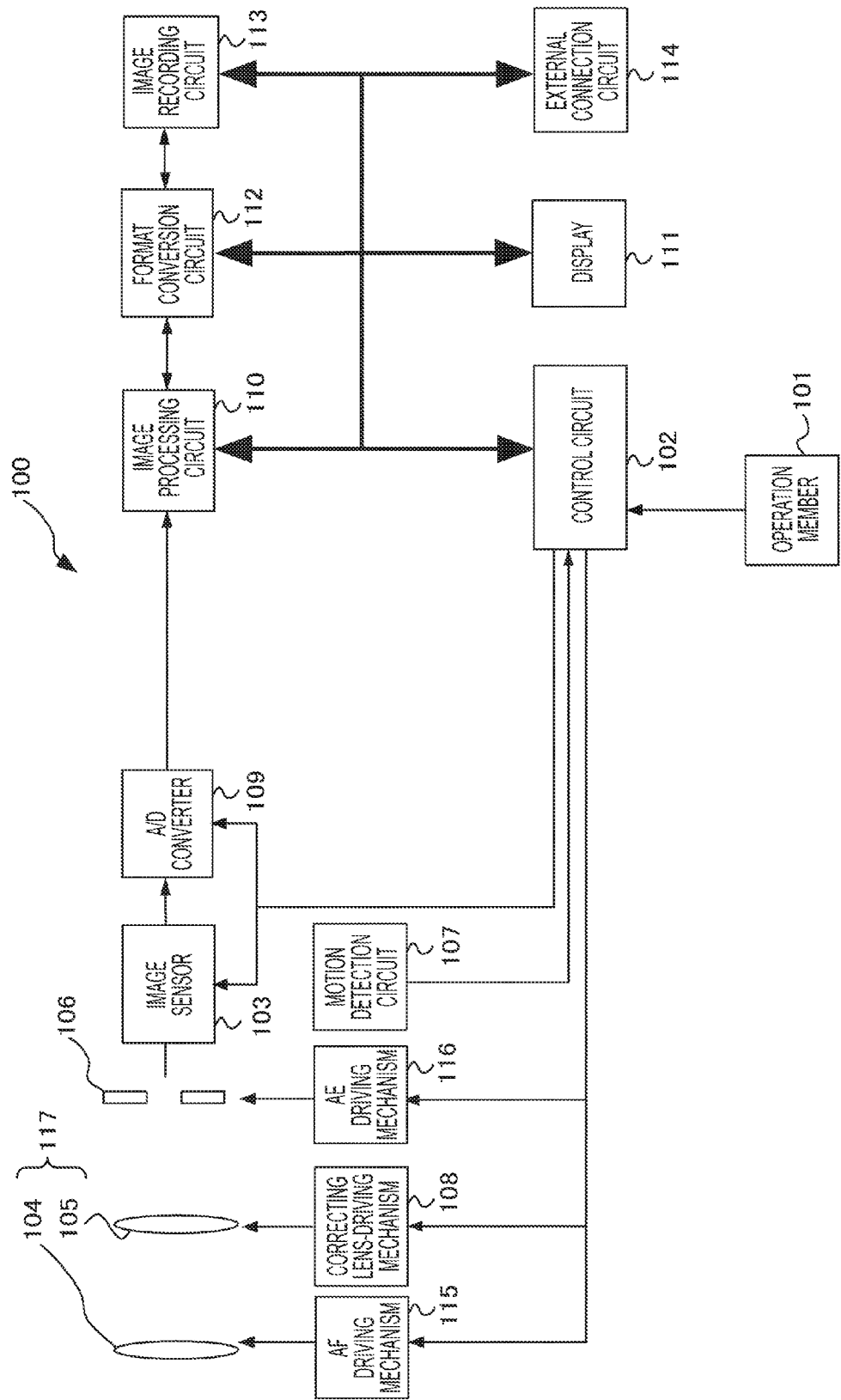
FIG. 1 is a block diagram of a digital camera.

First, a digital camera 100, which is an example of an image correction apparatus, and is an image pickup apparatus, will be described with reference to FIG. 1. FIG. 1 is a block diagram illustrating a functional configuration example of the digital camera 100.

An operation member 101 includes a switch and a button which an operator of the digital camera 100 operates to input various instructions to the digital camera 100. The operation member 101 also includes a shutter switch, and when the shutter switch is pressed halfway, the operation member 101 notifies a control circuit 102 of a signal SW1. In addition, when the shutter switch is pressed fully, the operation member 101 notifies the control circuit 102 of a signal SW2.

The control circuit 102 controls operations of each circuit and a mechanism illustrated in FIG. 1, and controls the operations of each circuit and the mechanism in accordance with instructions from the operation member 101. The control circuit 102 includes a processor such as a CPU and an MPU.

An image sensor 103 receives light incident through an image pickup optical system 117 and an exposure mechanism 106, and outputs an analog image signal based on an amount of incident light. The image sensor includes a CCD sensor or a CMOS sensor.

The image pickup optical system 117 is an optical system which includes a shooting lens 104 and a correcting lens 105.

The shooting lens 104 includes one or more lenses, and for example, includes a focusing lens.

The correcting lens 105 is a lens which corrects, by changing a position of the correcting lens 105, an image blur caused by motion of the digital camera 100. A correcting lens-driving mechanism 108 displaces the correcting lens 105 in accordance with an amount of lens position correction calculated by the control circuit 102 based on the motion of the digital camera 100 detected by a motion detection circuit 107, and thereby the image blur caused by the motion of the digital camera 100 is corrected.

The exposure mechanism 106 includes, for example, an aperture or a shutter.

The motion detection circuit 107 includes a sensor such as a gyro sensor or an acceleration sensor, and detects motion of the digital camera 100.

The correcting lens-driving mechanism 108 controls motion of the correcting lens 105 based on the control by the control circuit 102.

An A/D converter 109 performs sampling, gain adjustment, A/D conversion, and the like to the analog image signal output from the image sensor 103, and outputs a digital image signal. Hereinafter, the digital image signal may also be referred to as image data.

An image processing circuit 110 acquires the image data output from the A/D converter 109, performs various image processes to the acquired image data, and outputs the processed image data. The image processing circuit 110 performs image processes such as white balance and correction of magnification chromatic aberration, for example, to the image data received from the A/D converter 109, and outputs the processed image data. When correcting the magnification chromatic aberration, the image processing circuit 110 can switch correction methods in accordance with an operation amount of the correcting lens 105 corresponding to the motion of the digital camera 100 detected by the motion detection circuit 107. A display 111 includes a liquid crystal panel or an organic EL panel, and displays an image in accordance with the image data processed by the image processing circuit 110.

A format conversion circuit 112 converts a format of the image data output from the image processing circuit 110 to another format such as JPEG, and outputs the image data to an image recording circuit 113 or the like.

The image recording circuit 113 receives the image data subjected to the format conversion from the format conversion circuit 112 and records the image data in a memory (not illustrated) included in the digital camera 100, an external memory inserted into the digital camera 100, or the like.

An external connection circuit 114 functions as an interface for connecting the digital camera 100 to an external device such as a personal computer (PC) or a printer.

An autofocus (AF) driving mechanism 115 controls the shooting lens 104 based on the control by the control circuit 102.

An auto exposure (AE) driving mechanism 116 controls the exposure mechanism 106 based on the control by the control circuit 102.

The image processing circuit 110 and the format conversion circuit 112 includes an integrated circuit (ASIC) obtained by integrating circuits used for performing specific processes. Alternatively, the control circuit 102 performs processes in accordance with a program read from a ROM (not illustrated), and thereby the control circuit 102 may also perform a part or all of the functions of the image processing circuit 110 and the format conversion circuit 112. In a case where the control circuit 102 also performs all of the functions of the image processing circuit 110 and the format conversion circuit 112, there is no need to include these circuits as hardware.

Next, an operation of the digital camera 100, in a case where the digital camera 100 is used for image pickup, will be described.

First, an operator of the digital camera 100 turns on a power switch included in the operation member 101, which is detected by the control circuit 102, and the control circuit 102 supplies power to each unit constituting the digital camera 100. Then, the digital camera 100 performs a preparation process described below.

First, when power is supplied to each unit constituting the digital camera 100, the shutter is opened, light enters the image sensor 103 through the image pickup optical system 117 and the exposure mechanism 106 from outside. Then, charge in accordance with an amount of light which has entered therein is accumulated in photoelectric-conversion elements which constitute the image sensor 103.

At that time, an amount of lens position correction is calculated by the control circuit 102 in a manner corresponding to the motion of the digital camera 100 detected by the motion detection circuit 107. The correcting lens 105 operates in accordance with the amount of lens position correction under control of the correcting lens-driving mechanism 108. Consequently, the correcting lens 105 corrects an image blur caused by the motion of the digital camera 100.

Next, by the control circuit 102 controlling the image sensor 103, the image sensor 103 reads the charge accumulated in the image sensor 103, and outputs, to the A/D converter 109, the charge as an analog image signal.

Next, the A/D converter 109 performs sampling, gain adjustment, A/D conversion, and the like to the analog image signal output from the image sensor 103, and generates and outputs image data to the image processing circuit 110.

Next, the image processing circuit 110 acquires the image data output from the A/D converter 109, performs various image processes such as white balance and correction of magnification chromatic aberration to the acquired image data, and outputs the image data thus image-processed to the display 111. The display 111 displays an image in accordance with the image-processed image data.

Next, by the control circuit 102 controlling the AF driving mechanism 115, the AF driving mechanism 115 operates the shooting lens 104 to focus on an object based on the image data acquired by the image processing circuit 110. In addition, by the control circuit 102 controlling the AE driving mechanism 116, the AE driving mechanism 116 controls the exposure mechanism 106 such that the optimum exposure is obtained for a frame.

The preparation process has been described above, and the digital camera 100 repeats the preparation process until the control circuit 102 receives a notice of the signal SW1 (in other words, a notice of the half pressing of the shutter switch) from the shutter switch.

When the control circuit 102 receives the notice of the signal SW1 from the shutter switch, the digital camera 100 performs a pre-shooting process described below.

First, the control circuit 102 acquires focus and exposure setting conditions optimum for shooting by using image data at the point of time when the control circuit 102 receives the notice of the signal SW1.

Next, the control circuit 102 repeats the preparation processes until the control circuit 102 receives a notice of the signal SW2 (in other words, a notice of the full pressing of the shutter switch) from the shutter switch.

The pre-shooting process has been described above.

When the control circuit 102 receives the notice of the signal SW2 from the shutter switch, the digital camera 100 performs a main shooting process described below.

First, light enters the image sensor 103 through the image pickup optical system 117 and the exposure mechanism 106 from outside. Then, charge in accordance with an amount of entered light is accumulated in the photoelectric-conversion elements which constitute the image sensor 103.

Next, by the control circuit 102 controlling the image sensor 103, the image sensor 103 reads the charge accumulated in the image sensor 103, and outputs, to the A/D converter 109, the charge as an analog image signal.

Next, the A/D converter 109 performs sampling, gain adjustment, A/D conversion, and the like to the analog image signal output from the image sensor 103, and generates and outputs image data to the image processing circuit 110.

Next, the image processing circuit 110 acquires the image data output from the A/D converter 109, and performs, to the acquired image data, various image processes corresponding to shooting conditions. Examples of the various image processes include image processes such as white balance and correction of magnification chromatic aberration. The image processing circuit 110 outputs the image data thus image-processed to the format conversion circuit 112. When correcting magnification chromatic aberration, the image processing circuit 110 selects a correction method for the magnification chromatic aberration in accordance with an operation amount of the correcting lens 105 corresponding to the motion of the digital camera 100 detected by the motion detection circuit 107, and corrects the magnification chromatic aberration of the image data with the selected method.

Next, the format conversion circuit 112 converts a format of the image data output from the image processing circuit 110 to another format such as JPEG, and outputs the image data to the image recording circuit 113.

Next, the image recording circuit 113 records the image data of which the format has been converted in a predetermined memory or the like.

The main shooting process has been described above. When the main shooting process ends, the digital camera 100 returns to the process for repeating the preparation process.

Next, methods for correcting magnification chromatic aberration, which may be changed depending on an operation amount of the correcting lens 105, will be described.

Figure 2:
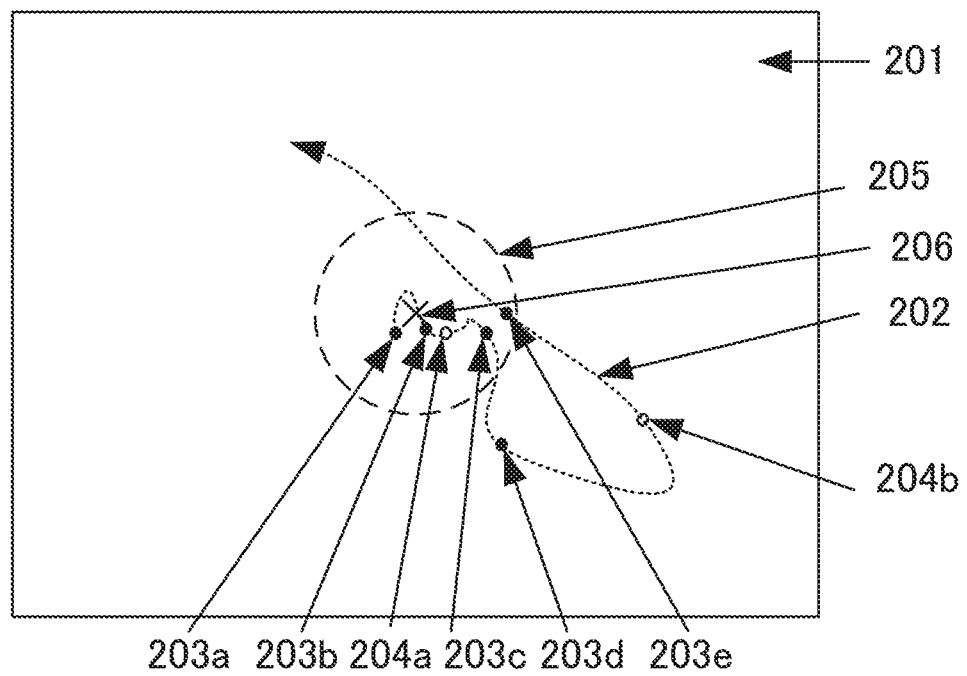
FIG. 2 illustrates motion of an optical axis in an image region.

First, with reference to FIG. 2, a move of an optical axis in an image region 201, timing for acquiring position information of the correcting lens 105, and shooting timing will be described. FIG. 2 illustrates motion of the optical axis in the image region 201.

The image region 201 is a region in the image sensor 103 which receives incident light, and a region where photoelectric-conversion elements are disposed. In each of the photoelectric-conversion elements, charge as an origin of the analog image signal output to the A/D converter 109 from the image sensor 103 is accumulated.

An optical axis 202 of the image pickup optical system 117 in the image region 201 continuously moves depending on a position of the correcting lens 105. Since the correcting lens 105 moves in a manner corresponding to the motion of the digital camera 100 as described above, it may be said that the optical axis 202 of the image pickup optical system 117 moves in a manner corresponding to the motion of the digital camera 100.

The timing for the control circuit 102 to acquire position information of the optical axis 202 in the image region 201 is discrete. Therefore, as illustrated in FIG. 2, positions 203a to 203e of the optical axis 202 acquired by the control circuit 102 are discrete information. Positions 204a and 204b of the optical axis 202 during shooting are any positions of the optical axis 202 which moves in the image region 201.

A determination range 205 is set in the image region 201. The determination range 205 is a region used for determining a magnitude of the operation amount of the correcting lens 105, and, for example, is a circular region having, as the center thereof, the center point of the image region 201. In a case where the image pickup optical system 117 has a zooming function, a movement range of the optical axis 202 corresponding to the operation of the correcting lens 105 in the image region 201 varies depending on a focal length of the image pickup optical system 117. Accordingly, the determination range 205 which determines a magnitude of the operation amount of the correcting lens 105 in accordance with the focal length of the image pickup optical system 117 is to be changed. The determination range 205 may be a predetermined region.

When the motion of the digital camera 100 is small, the operation amount of the correcting lens 105 is small, and the optical axis 202 is at the center or in the vicinity of the center of the image region 201.

On the other hand, the operation amount of the correcting lens 105 increases when the motion of the digital camera 100 increases, and the optical axis 202 may depart from the center or the vicinity of the center of the image region 201. When the operation amount of the correcting lens 105 increases and the optical axis 202 departs from the center or the vicinity of the center of the image region 201, there may occur a case where when the control circuit 102 acquires the position of the correcting lens 105 two times in a row, there is a significant difference between the position of the correcting lens 105 acquired at the first time and that acquired at the second time. For example, there may be a case where the optical axis 202 is at the position 203d when the control circuit 102 acquires the position of the correcting lens 105 at the first time, the optical axis 202 is at the position 203e when the control circuit 102 acquires the position of the correcting lens 105 at the second time, and the optical axis 202 is at the position 204b during shooting. The positions 203d, 203e, and 204b are significantly different from one another as illustrated in FIG. 2.

When the motion of the digital camera 100 increases, the optical axis 202 widely moves all over the image region 201. Accordingly, even when the optical axis 202 is at the center or in the vicinity of the center of the image region 201 at a certain timing, the operation amount of the correcting lens 105 is not always small.

Therefore, the control circuit 102 determines the operation amount of the correcting lens 105 as follows.

First, the control circuit 102 acquires the position of the optical axis 202 a plurality of times.

Next, when all of the multiple positions of the optical axis 202 successively acquired are in the determination range 205, the control circuit 102 determines that the operation amount of the correcting lens 105 is less than or equal to a predetermined amount. In addition, when at least one of the multiple positions of the optical axis 202 successively acquired is out of the determination range 205, the control circuit 102 determines that the operation amount of the correcting lens 105 is greater than the predetermined amount.

In addition, when the control circuit 102 again acquires the position of the optical axis 202 a plurality of times, and all of the multiple positions of the optical axis 202 successively acquired are in the determination range 205, the control circuit 102 determines that the operation amount of the correcting lens 105 is less than or equal to the predetermined amount.

The number of positions of the optical axis 202 used for the determination whether the operation amount of the correcting lens 105 is greater than the predetermined amount is determined in advance, for example, by being recorded in a memory (not illustrated) included in the digital camera 100.

As described above, the digital camera 100 acquires a plurality of positions of the optical axis 202, and determines whether the operation amount of the correcting lens 105 is greater than the predetermined amount in accordance with whether any one of the positions of the optical axis 202 is out of the determination range 205. Consequently, the digital camera 100 can determine the operation amount of the correcting lens 105 without performing a complicated process.

When the control circuit 102 can acquire velocity information of the optical axis 202 in the image region 201, the operation amount of the correcting lens 105 may be determined by using not the position information of the optical axis 202 in the image region 201, but the velocity information of the optical axis 202.

At that time, the control circuit 102 determines that the operation amount of the correcting lens 105 is greater than the predetermined amount when the velocity of the optical axis 202 in the image region 201 is greater than a predetermined velocity. The control circuit 102 determines that the operation amount of the correcting lens 105 is less than or equal to the predetermined amount when the velocity of the optical axis 202 in the image region 201 is less than or equal to the predetermined velocity.

When the velocity of the movement of the digital camera 100 increases, the velocity of the operation of the correcting lens 105 increases, and there may be a case where the positions 203d and 203e of the optical axis 202 acquired by the control circuit 102 are significantly different from the position 204b of optical axis 202 during shooting, as described above. In addition, when the velocity of the operation of the correcting lens 105 is slow, the difference between the positions 203b and 203c of the optical axis 202 acquired by the control circuit 102, and the position 204a of the optical axis 202 during shooting decreases.

As described above, with the use of the velocity information of the optical axis 202 for the determination of the operation amount of the correcting lens 105, accurate determination can be performed.

Next, a description will be given for correction of magnification chromatic aberration performed by the digital camera 100 when the control circuit 102 determines that the operation amount of the correcting lens 105 is less than or equal to the predetermined amount. Hereinafter, image data as an object of the correction of the magnification chromatic aberration is referred to as picked-up image data. The picked-up image data is image data based on the analog image signal obtained in the image sensor 103. In addition, a position in the image data corresponding to the position of the optical axis 202 in the image region 201 is referred to as a position of the optical axis in the image data.

When the control circuit 102 determines that the operation amount of the correcting lens 105 is less than or equal to the predetermined amount, the image processing circuit 110 corrects the magnification chromatic aberration by a first correction method. In the first correction method, a predetermined position in the picked-up image data is employed as the center of the correction, and the magnification chromatic aberration is corrected with respect to the picked-up image data with the same amount of correction for points located at positions equidistant from the center of the correction. The predetermined position in the picked-up image data is a position corresponding to a position 206 which is the center of the image region 201. The first correction method is used for correcting symmetric magnification chromatic aberration in a case where the correcting lens 105 does not operate. The amount of correction in the first correction method is recorded in advance, for example, in a memory (not illustrated) included in the digital camera 100. In the example in FIG. 2, when the optical axis 202 is at the position 204a during shooting, the center of the correction of the picked-up image data is set at the position 206, which is the center of the image region 201, in the first correction method.

When the operation amount of the correcting lens 105 is small, a shift of the optical axis 202 from the center of the image region 201 is not large, and accordingly, asymmetry of the magnification chromatic aberration is also small. As a result, correction error is small even when the center of the frame is used as the center of the correction. Furthermore, in the first correction method, erroneous correction resulting from a calculation error, which occurs in calculation of the amount of the magnification chromatic aberration correction from the picked-up image data, can be prevented and a calculation load is small.

Next, with reference to FIGS. 3A and 3B, a description will be given for magnification chromatic aberration and correction of the magnification chromatic aberration in a case where the optical axis 202 during shooting coincides with the center of the image region 201.

Figure 3A:
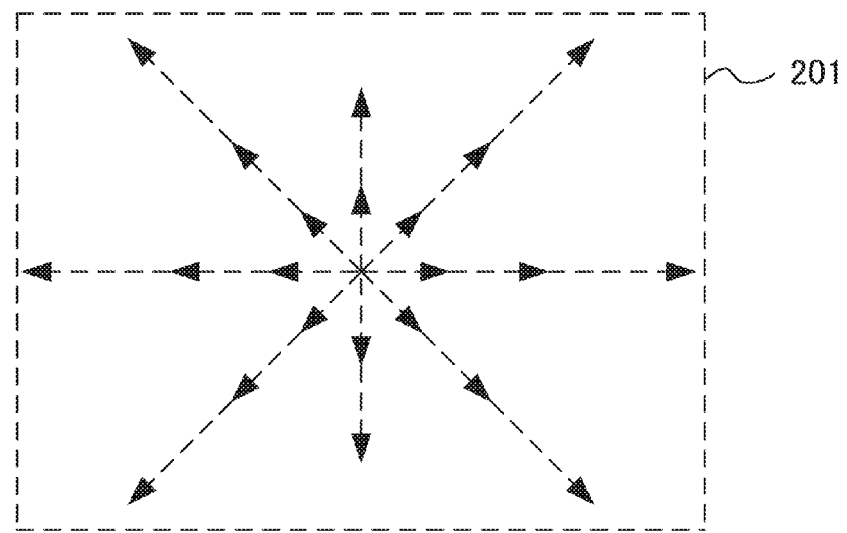
FIG. 3A illustrates vectors of magnification chromatic aberration.
Figure 3B:
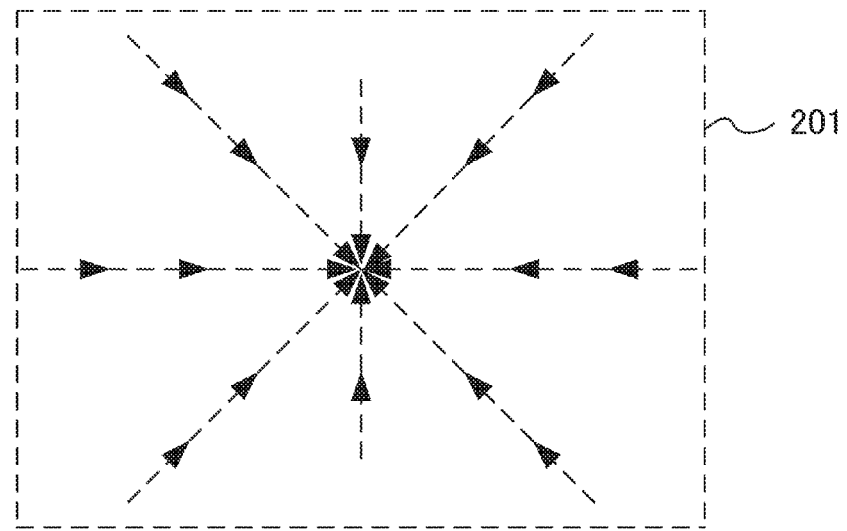
FIG. 3B illustrates vectors of correction components of the magnification chromatic aberration.

FIG. 3A illustrates occurrence of the magnification chromatic aberration in the image region 201. Each arrow in the image region 201 in FIG. 3A illustrates a vector of the magnification chromatic aberration of a color component. If it is image data obtained by an image sensor including a RGB Bayer pattern, magnification chromatic aberration of an R component and that of a B component may be each obtained such that image data of the R component and that of the B component each coincide with the image data of a G component. FIG. 3A illustrates that the greater the distance outward from the center of the image region 201, the greater the magnitude of the magnification chromatic aberration which has occurred, and that the magnification chromatic aberration has occurred in a point symmetry with respect to the center of the image region 201.

In order to correct the magnification chromatic aberration in FIG. 3A, the color component is moved in the same magnitude in a direction opposite to the direction in which the magnification chromatic aberration has occurred in a point symmetry with respect to the center of the image region 201. An amount having the direction and the magnitude is referred to as a vector of a correction component. With this regard, a description will be given with reference to FIG. 3B. FIG. 3B illustrates vectors of correction components of the magnification chromatic aberration in the image region 201. Each arrow in the image region 201 in FIG. 3B illustrates a vector of a correction component with respect to the magnification chromatic aberration illustrated in FIG. 3A. FIG. 3B illustrates that vectors of the correction components are directed to the center of the image region 201, and the greater the distance from the center of the image region 201, the greater the magnitude of the vectors of the correction components.

Next, with reference to FIGS. 4A and 4B, a description will be given for magnification chromatic aberration and correction of the magnification chromatic aberration in a case where the optical axis 202 during shooting does not coincide with the center of the image region 201, and the operation amount of the correcting lens 105 is determined to be less than or equal to the predetermined amount.

Figure 4A:
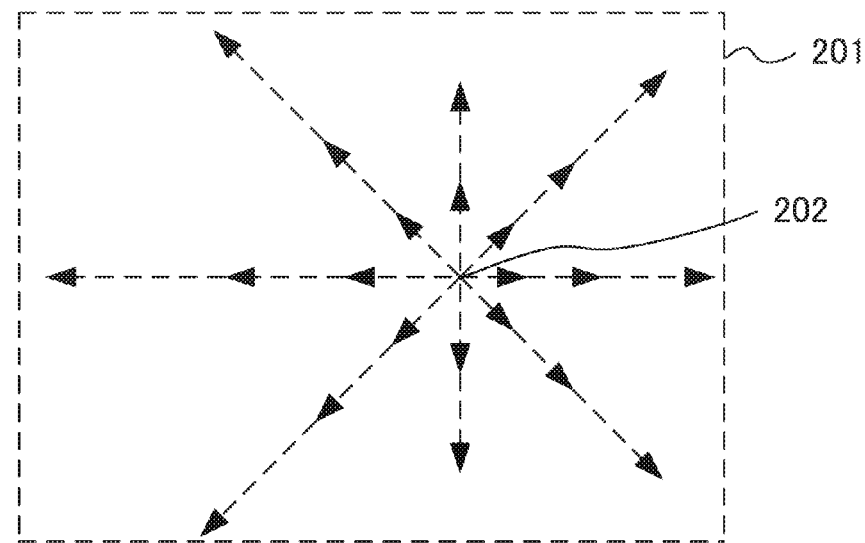
FIG. 4A illustrates vectors of magnification chromatic aberration.

FIG. 4A illustrates the magnification chromatic aberration occurring in the image region 201 when the optical axis 202 shifts rightward from the center of the image region 201. Arrows in FIG. 4A mean the same as those in FIG. 3A. In a case where the optical axis 202 shifts rightward from the center of the image region 201, as illustrated in FIG. 4A, an amount of the magnification chromatic aberration occurring in a right-side portion of the image region 201 is small in comparison to a case where the optical axis 202 is at the center of the image region 201, and an amount of the magnification chromatic aberration occurring in a left-side portion of the image region 201 is large in comparison to a case where the optical axis 202 is at the center of the image region 201.

Next, with reference to FIG. 4B, correction results will be described. The correction results are obtained from correction of the magnification chromatic aberration illustrated in FIG. 4A, employing the center of the image region 201 as the center of the correction. FIG. 4B illustrates vectors (corrected vectors) of the magnification chromatic aberration obtained when the vectors of the correction components of the magnification chromatic aberration, which employ the center of the image region 201 as the center of the correction, is applied to the vectors of the magnification chromatic aberration illustrated in FIG. 4A. When each of the corrected vectors is a zero vector, it means that the magnification chromatic aberration is eliminated.

Figure 4B:
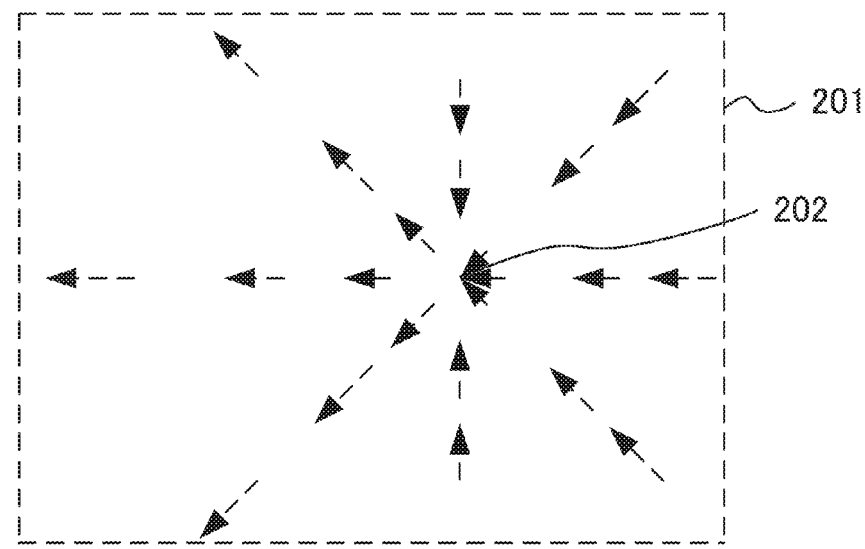
FIG. 4B illustrates corrected vectors of the magnification chromatic aberration.

As illustrated in FIG. 4B, when the correction of the magnification chromatic aberration illustrated in FIG. 4A is performed by employing the center of the image region 201 as the center of the correction, the following results are obtained. In other words, in the right-side portion of the image region 201, an amount of the correction exceeds the amount of the magnification chromatic aberration which has occurred, and thus inverse correction components have occurred and the corrected vectors are directed leftward. In addition, in the left-side portion of the image region 201, an amount of the correction is less than the amount of the magnification chromatic aberration which has occurred, and thus the amount of the correction is insufficient and the corrected vectors are directed leftward.

As described above, in a case where the magnification chromatic aberration is corrected by employing the center of the image region 201 as the center of the correction when the optical axis 202 does not coincide with the center of the image region 201, the correction accuracy decreases in comparison with the case described with reference to FIG. 3. However, there is no need to correct the picked-up image data with high accuracy when the inverse correction components or insufficiencies of the correction are small with respect to a pixel pitch of an image pickup element, accuracy of signal processing, or a reproduction environment of image data. When the operation amount of the correcting lens 105 is small, a certain level of accuracy is secured for the correction, which is considered to be acceptable.

Here, as the center of the correction of the picked-up image data in the first correction method, a position corresponding to the position 206 which is the center of the image region 201 is employed. However, as the center of the correction of the picked-up image data in the first correction method, a position of the picked-up image data corresponding to the position of the optical axis 202 of the image pickup optical system 117 acquired by the image processing circuit 110 or the control circuit 102 may be employed. When the operation amount of the correcting lens 105 is small, a difference between the position of the optical axis 202 of the image pickup optical system 117 acquired by the image processing circuit 110 or the control circuit 102 and the position of the optical axis 202 during shooting is small, and therefore, a certain level of accuracy is secured for the correction.

Next, correction of the magnification chromatic aberration will be described which is performed by the digital camera 100 when the operation amount of the correcting lens 105 has been determined by the control circuit 102 to be greater than the predetermined amount.

When the operation amount of the correcting lens 105 has been determined by the control circuit 102 to be greater than the predetermined amount, the image processing circuit 110 corrects the magnification chromatic aberration by a second correction method. In the second correction method, magnification chromatic aberration is corrected with respect to the picked-up image data based on a correction amount obtained from the picked-up image data.

An example of the second correction method will be described.

First, with respect to picked-up image data, the control circuit 102 sets eight divided regions divided by eight borderlines which extend outward from the center point of the picked-up image data. Angles formed by two adjacent borderlines are all the same. A divided region located above the center point of the picked-up image data is designated as an upper region, and other divided regions are separately designated as an upper-right region, a right region, a lower-right region, a lower region, a lower-left region, a left region, and an upper-left region, in a clockwise direction from the upper region in this order.

In addition, the control circuit 102 sets four region groups. The region groups include, an upper group, a right group, a lower group, and a left group. The upper group includes the upper-left region, the upper region, and the upper-right region. The right group includes the upper-right region, the right region, and the lower-right region. The lower group includes the lower-right region, the lower region, and the lower-left region. The left group includes the lower-left region, the left region, and the upper-left region. Next, the control circuit 102 detects an edge for each of the divided regions, and sets a predetermined range including the edge. Then the control circuit 102 separately extracts image data of two different color components (for example, an R component and a G component) from the predetermined range. While the image data of two color components are shifted to each other in a radial direction (direction away from or toward the center point), a difference between signal levels of the two image data is calculated, and a shift amount which provides the minimum difference is obtained. The shift amount is a magnification difference of the R component with respect to the G component at the position of the edge. Regarding the B component, similarly, a magnification difference of the B component with respect to the G component is obtained.

Next, the control circuit 102 totals, for each region group, the magnification differences obtained for each portion where the edge has been detected, performs a histogram analysis of the magnification differences, and obtains the magnification difference in each region group.

Next, the control circuit 102 divides the picked-up image data into four sections of an upper-right section, a lower-right section, a lower-left section, and an upper-left section, employing the center point of the picked-up image data as the center of the sections. The upper-right section includes the upper-right region, a half of the upper region located on the upper-right region side, and a half of the right region located on the upper-right region side. The lower-right section includes the lower-right region, a half of the right region located on the lower-right region side, and a half of the lower region located on the lower-right region side. The lower-left section includes the lower-left region, a half of the left region located on the lower-left region side, and a half of the lower region located on the lower-left region side. The upper-left section includes the upper-left region, a half of the upper region located on the upper-left region side, and a half of the left region located on the upper-left region side.

Next, regarding each section, the control circuit 102 combines the magnification differences of the region groups partially included in each section to perform vector composition, and thereby calculating a displacement vector of the color shift. The displacement vector of the color shift corresponds to the amount of correction of the magnification chromatic aberration. Next, the control circuit 102 corrects the magnification chromatic aberration with respect to the picked-up image data based on the displacement vector of the color shift.

The second correction method may be any method as long as it is a method for calculating an amount of correction of magnification chromatic aberration from picked-up image data, and is not limited to the method described in US 2008/0062409.

The following is the reason why magnification chromatic aberration is corrected with respect to picked-up image data based on a correction amount obtained from the picked-up image data, when the operation amount of the correcting lens 105 has been determined by the control circuit 102 to be greater than the predetermined amount.

When correction of symmetric magnification chromatic aberration, which employs the center point of the picked-up image data as the center of the correction, is performed with respect to magnification chromatic aberration in which a symmetry is significantly broken, there occurs much erroneous correction and the magnification chromatic aberration of captured image data is noticeable. When the operation amount of the correcting lens 105 is greater than the predetermined amount, the position of the optical axis 202 during shooting and the position of the optical axis 202 of the image pickup optical system 117 acquired by the image processing circuit 110 or the control circuit 102 are significantly different from each other. Therefore, when correction for symmetric magnification chromatic aberration, which employs the center point of the picked-up image data as the center of the correction, is performed with respect to magnification chromatic aberration in which a symmetry is significantly broken, the magnification chromatic aberration of the image data is noticeable. Therefore, when the operation amount of the correcting lens 105 has been determined by the control circuit 102 to be greater than the predetermined amount, correction of the magnification chromatic aberration is performed with respect to the picked-up image data based on the correction amount obtained from the picked-up image data.

Next, with reference to FIGS. 5A and 5B, a description will be given for magnification chromatic aberration and correction of the magnification chromatic aberration in a case where the optical axis 202 during shooting does not coincide with the center of the image region 201, and the operation amount of the correcting lens 105 is determined to be greater than the predetermined amount.

Figure 5A:
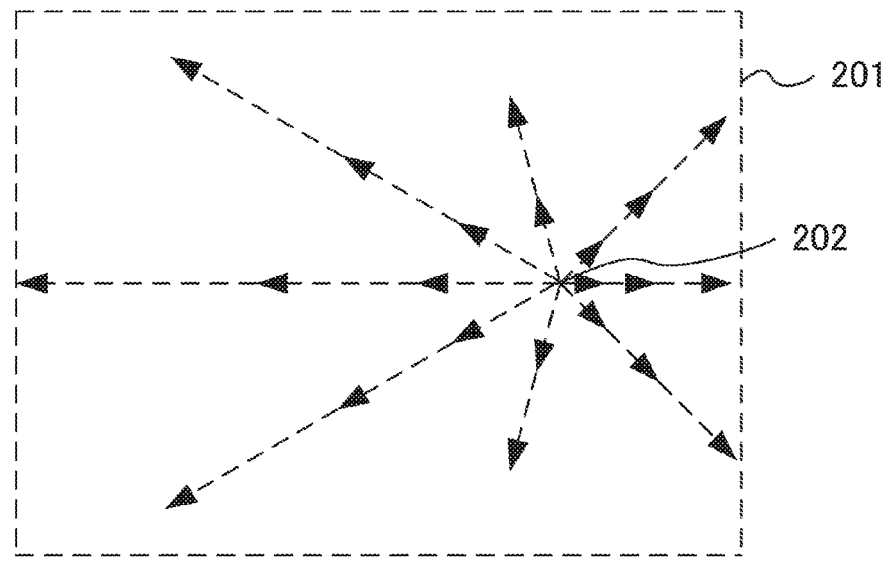
FIG. 5A illustrates vectors of magnification chromatic aberration.

FIG. 5A illustrates the magnification chromatic aberration occurring in the image region 201 when the optical axis 202 shifts rightward from the center of the image region 201. Arrows in FIG. 5A mean the same as those in FIG. 3A. In a case where the optical axis 202 shifts rightward from the center of the image region 201, as illustrated in FIG. 5A, an amount of the magnification chromatic aberration occurring in a right-side portion of the image region 201 is small in comparison to a case where the optical axis 202 is at the center of the image region 201, and an amount of the magnification chromatic aberration occurring in a left-side portion of the image region 201 is large in comparison to a case where the optical axis 202 is at the center of the image region 201. Furthermore, asymmetry with respect to the optical axis 202 during shooting increases as well.

Next, with reference to FIG. 5B, correction results will be described. The correction results are obtained from correction of the magnification chromatic aberration illustrated in FIG. 5A, employing the center of the image region 201 as the center of the correction. Arrows in FIG. 5B mean the same as those in FIG. 4B.

Figure 5B:
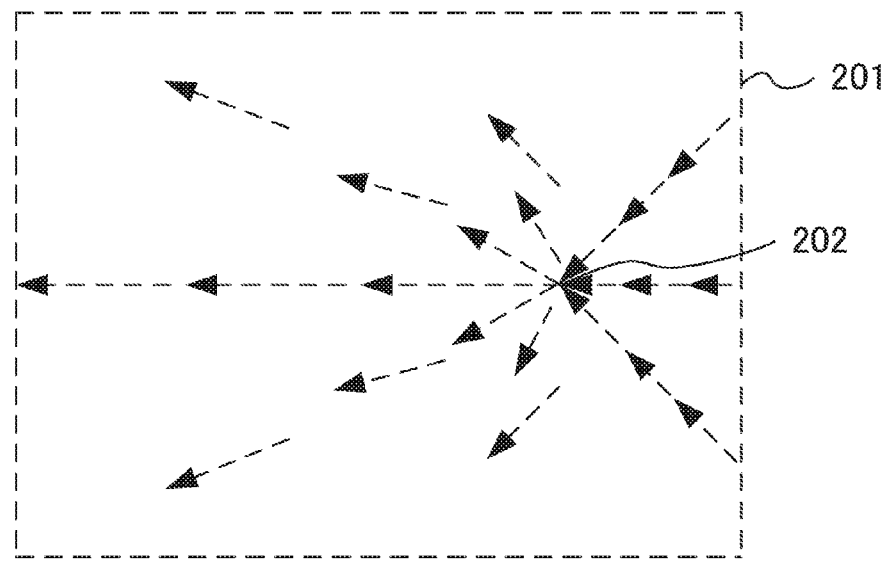
FIG. 5B illustrates corrected vectors of the magnification chromatic aberration.

As illustrated in FIG. 5B, when the correction of the magnification chromatic aberration illustrated in FIG. 5A is performed by employing the center of the image region 201 as the center of the correction, the following results are obtained. In other words, in the right-side portion of the image region 201, an amount of the correction exceeds the amount of the magnification chromatic aberration which has occurred, and thus inverse correction components have occurred and the corrected vectors are directed leftward. In addition, in the left-side portion of the image region 201, an amount of the correction is less than the amount of the magnification chromatic aberration which has occurred, and thus the amount of the correction is insufficient and the corrected vectors are directed leftward. Then, there occurs much erroneous correction of the magnification chromatic aberration in the entirety of the corrected picked-up image data. There may be a need to correct the picked-up image data with high accuracy when the inverse correction components or insufficiencies of the correction are large with respect to a pixel pitch of an image pickup element, accuracy of signal processing, or a reproduction environment of image data.

As described above, when the operation amount of the correcting lens 105 has been determined by the control circuit 102 to be greater than the predetermined amount and the magnification chromatic aberration is corrected employing the center of the image region 201 as the center of the correction, there occurs much erroneous correction of the magnification chromatic aberration. Therefore, in such a case, the second correction method is used for the correction as described above.

As described above, the digital camera 100 corrects, with respect to the picked-up image data, the magnification chromatic aberration with a correction method in accordance with the operation amount of the correcting lens 105.

Consequently, it is possible to suppress a data amount and a calculation amount, and to correct the magnification chromatic aberration in a manner suitable to image data.

In particular, the digital camera 100 performs the correction by the first correction method when the operation amount of the correcting lens 105 is less than or equal to the predetermined amount, and performs the correction by the second correction method when the operation amount of the correcting lens 105 is greater than the predetermined amount. In the first correction method, a predetermined position in the picked-up image data is employed as the center of the correction, and the magnification chromatic aberration is corrected with respect to the picked-up image data with the same amount of correction for points located at positions equidistant from the center of the correction. In the second correction method, the magnification chromatic aberration is corrected with respect to the picked-up image data based on the correction amount obtained from the picked-up image data.

In the first correction method, an amount of correction obtained when the center of the correction is located at the center of the picked-up image data, or an amount of correction obtained when the center of the correction is located at a region corresponding to the determination range 205 of the image region 201 in the picked-up image data may be recorded in a memory or the like in the digital camera 100. Therefore, it is possible to reduce an amount of data required to correct the magnification chromatic aberration in the first correction method in comparison to an amount of data on an amount of correction required when all positions in the picked-up image data could be the center of the correction. In addition, unlike the second correction method, there is no need in the first correction method to obtain the amount of the magnification chromatic aberration correction from the picked-up image data, and therefore, a calculation amount can be suppressed.

In the second correction method, since the amount of the magnification chromatic aberration correction is obtained from the picked-up image data, there is no need to record the amount of the correction in a memory or the like in the digital camera 100. In addition, in the second correction method, since the amount of the magnification chromatic aberration correction is obtained from the picked-up image data, it is possible to correct the magnification chromatic aberration irrespective of the position of the optical axis in image data.

Therefore, the digital camera 100 selects the first correction method or the second correction method depending on whether the operation amount of the correcting lens 105 is greater than the predetermined amount to correct the magnification chromatic aberration, and thereby it is possible to avoid holding an excess amount of data on the amount of the magnification chromatic aberration correction. Furthermore, it is not assumed that the amount of the magnification chromatic aberration correction is obtained from the picked-up image data when correcting the magnification chromatic aberration, and therefore, a calculation amount can be suppressed as a whole.

The digital camera 100 described above switches correction methods of the magnification chromatic aberration based on the operation amount of the correcting lens 105.

However, when exposure time is prolonged, it is difficult to follow up and correct blurs, and as a result, blurred image data is shot. It is not necessary to accurately correct blurred image data since the magnification chromatic aberration is not discriminated in such blurred image data. Therefore, when blurred image data is shot, there is no need to use the second correction method, which is a correction method with a high load, and to perform correction of the magnification chromatic aberration itself.

Accordingly, the digital camera 100 may correct the magnification chromatic aberration as follows.

First, the control circuit 102 determines whether image pickup conditions during shooting with the digital camera 100 are image pickup conditions under which image data including a remaining blur is picked up. For example, the determination is performed based on a focal length of the image pickup optical system 117 and exposure time during image pickup. Alternatively, the determination may be performed based on whether the exposure time during image pickup exceeds a predetermined period of time.

Next, in a case where the image pickup conditions during shooting with the digital camera 100 are image pickup conditions under which image data including a remaining blur is picked up, the control circuit 102 corrects the magnification chromatic aberration by the first correction method. In a case where the image pickup conditions are image pickup conditions under which image data including a remaining blur is picked up, there is no need to perform correction of the magnification chromatic aberration itself.

Alternatively, in a case where the image pickup conditions during shooting with the digital camera 100 are not image pickup conditions under which image data including a remaining blur is picked up, as described above, the control circuit 102 switches correction methods of the magnification chromatic aberration based on the operation amount of the correcting lens 105.

As described above, in a case where the image pickup conditions during shooting with the digital camera 100 are image pickup conditions under which image data including a remaining blur is picked up, the second correction method is not used, or the correction of the magnification chromatic aberration itself is not performed. Consequently, the frequency of executing the second correction method with much calculation amount can be suppressed. In addition, in image data including a blur remaining even after the above-described process, the magnification chromatic aberration cannot be discriminated and therefore there is no need of accurate correction thereof. Consequently, the effect of shooting with the digital camera 100 on final image data is small.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2015-252295, filed Dec. 24, 2015, which is hereby incorporated by reference herein in its entirety.

What is claimed is:

1. An apparatus comprising:
   an image processing circuit that corrects magnification chromatic aberration with respect to picked-up image data which has been picked up by an image sensor through an image pickup optical system that includes a correcting lens that corrects an image blur by shifting a position of the correcting lens,
   wherein in accordance with an operation amount of the correcting lens, the image processing circuit selects and executes either of a first correction process in which a correction amount stored in a memory in advance is read, and magnification chromatic aberration is corrected with respect to the picked-up image data, or a second correction process in which a correction amount is calculated using the picked-up image data, and magnification chromatic aberration is corrected with respect to the picked-up image data, and
   wherein the image processing circuit selects either of the first correction process or the second correction process depending on whether the operation amount of the correcting lens is greater than a predetermined amount.

2. The apparatus according to claim 1,
   wherein the image processing circuit performs the first correction process when the operation amount of the correcting lens is less than or equal to the predetermined amount, and performs the second correction process when the operation amount of the correcting lens is greater than the predetermined amount.

3. The apparatus according to claim 1,
   wherein in the first correction process, the image processing circuit employs a predetermined position in the picked-up image data as a center of correction and employs the same amount of correction for points located at positions equidistant from the center of the correction.

4. The apparatus according to claim 3,
   wherein the predetermined position is a position corresponding to an obtained position of an optical axis of the image pickup optical system.

5. The apparatus according to claim 3,
   wherein the predetermined position is a position corresponding to a center point of a region of the image sensor that receives incident light that is an origin of the picked-up image data.

6. The apparatus according to claim 2,
   wherein the image processing circuit performs the first correction process when exposure time of the picked-up image data during image pickup does not exceed a predetermined period of time.

7. The apparatus according to claim 1,
   wherein the image processing circuit determines whether the operation amount of the correcting lens is greater than the predetermined amount based on a position of an optical axis of the image pickup optical system.

8. The apparatus according to claim 1,
   wherein the image processing circuit acquires a plurality of positions of an optical axis of the image pickup optical system, and determines whether the operation amount of the correcting lens is greater than the predetermined amount depending on whether any one of the positions of the optical axis of the image pickup optical system is out of a determination range including a center point in a region of an image pickup unit that receives incident light that is an origin of the picked-up image data.

9. The apparatus according to claim 8,
   wherein the determination range varies based on a focal length of the image pickup optical system.

10. The apparatus according to claim 1,
    wherein the image processing circuit determines whether the operation amount of the correcting lens is greater than the predetermined amount based on a velocity of an optical axis of the image pickup optical system.

11. A method for controlling an apparatus, the method comprising:
    acquiring picked-up image data that has been picked up by an image sensor through an image pickup optical system that includes a correcting lens that corrects an image blur by shifting a position of the correcting lens;
    acquiring an operation amount of the correcting lens; and
    in accordance with the operation amount of the correcting lens, selecting and executing either of a first correction process in which a correction amount stored in a memory in advance is read with respect to the acquired picked-up image data, and magnification chromatic aberration is corrected with respect to the picked-up image data, or a second correction process in which a correction amount is calculated using the picked-up image data, and magnification chromatic aberration is corrected with respect to the picked-up image data,
    wherein the selecting selects either of the first correction process or the second correction process depending on whether the operation amount of the correcting lens is greater than a predetermined amount.

12. The method according to claim 11, further comprising:
    performing the first correction process when the operation amount of the correcting lens is less than or equal to the predetermined amount; and
    performing the second correction process when the operation amount of the correcting lens is greater than the predetermined amount.

13. The method according to claim 11, further comprising:
    in the first correction process, employing a predetermined position in the picked-up image data as a center of correction and employing the same amount of correction for points located at positions equidistant from the center of the correction.

14. The method according to claim 12, further comprising:
    performing the first correction process when exposure time of the picked-up image data during image pickup does not exceed a predetermined period of time.

15. The method according to claim 11, further comprising:
  determining whether the operation amount of the correcting lens is greater than the predetermined amount based on a position of an optical axis of the image pickup optical system.

16. The method according to claim 11, further comprising:
  acquiring a plurality of positions of an optical axis of the image pickup optical system; and
  determining whether the operation amount of the correcting lens is greater than the predetermined amount depending on whether any one of the positions of the optical axis of the image pickup optical system is out of a determination range including a center point in a region of an image pickup unit that receives incident light that is an origin of the picked-up image data.

17. The method according to claim 16, wherein the determination range varies based on a focal length of the image pickup optical system.

18. The method according to claim 11, further comprising:
  determining whether the operation amount of the correcting lens is greater than the predetermined amount based on a velocity of an optical axis of the image pickup optical system.

* * * * *